Aug. 28, 1962 R. W. CASHMAN ETAL 3,050,828
TOOL HOLDER
Filed Sept. 28, 1960

INVENTORS
ROBERT W. CASHMAN
ANTHONY WASCO, JR.
BY
Learman Learman & McCulloch
ATTORNEYS

United States Patent Office 3,050,828
Patented Aug. 28, 1962

3,050,828
TOOL HOLDER
Robert W. Cashman and Anthony Wasco, Jr., Saginaw, Mich., assignors to Saginaw Machine and Tool Company, Saginaw, Mich., a corporation of Michigan
Filed Sept. 28, 1960, Ser. No. 59,056
4 Claims. (Cl. 29—96)

This invention relates to tool holders and more particularly to tool holders of the class adapted for use with so-called indexible or throwaway cutting tips or bits.

It has become fairly common in recent years to form metal cutting bits of extremely hard material such as carbide, for example, and to shape the bit in such manner as to enable it to provide a plurality of uniform cutting tips or surfaces. Such bits may be removably clamped in a slot or the like formed in a tool holder in such manner as to present one of its cutting tips to a workpiece and used in metal cutting operations until the cutting tip or point becomes dull. When dullness of the cutting point occurs, the bit may be withdrawn from the recess and indexed or adjusted relatively to the tool holder so as to present a fresh cutting point to a workpiece. This procedure may be repeated until all of the cutting points have been dulled, at which time the bit may be replaced with a new bit.

Tools and tool holders of the kind referred to have been fairly well received in the industry and are quite satisfactory in many applications. In many instances, however, the tool holders of the prior art have been unsatisfactory, especially in the case where a single tool is required to perform multiple operations, such as turning, boring, and facing, for example. A tool subjected to multiple operations has pressures applied to it from many directions. If the bit is capable of movement relative to the tool holder, a change in function of the tool, such as from turning to facing, for example, can effect a shifting of the tool relative to the tool holder and result in inaccurate machining operations.

Another disadvantage of some tool holders of the kind under consideration is that they rely solely upon frictional engagement between the removable tool bit and its clamping mechanism to retain the bit in place in the tool holder. If a tool supported in such a holder is subjected to operations requiring it to partake of reciprocating movements, it has been found that shifting of the tool relatively to its holder quite likely takes place. As a result, such tool holders cannot be relied upon to maintain the tool bit immovable relatively to its holder and, consequently, such devices are incapable of performing high precision machining operations.

Known tool holders of the general class having slots adapted to receive indexible or throwaway tool bits require extremely careful attention of the user during changing or indexing of tool bits, in order to prevent chips or other foreign matter from entering the slot or recess formed in the tool holder and interfering with the proper seating of the tool bit. If the bit is incapable of being seated properly in its slot, the tool not only is likely to extend farther than it should from the holder but the clearance and rake angles of the tool may not be properly set for the kind of work being done. As a result, it is not unusual for tool holders of the kind heretofore known to be required to be presented to preset apparatus each time a tool bit is indexed or changed. This is a time consuming and therefore costly procedure.

An object of this invention is to provide a tool holder for a removable and indexible bit and which is capable of being fed to a workpiece in any one of a number of directions without risking loosening or shifting of the tool bit.

Another object of the invention is to provide a tool holder adapted for use with indexible or throwaway tool bits and wherein the tool holder provides for self-centering seating of the tool bit.

A further object of the invention is to provide a tool holder of the kind referred to wherein the risk of improper tool seating is substantially eliminated.

Another object of the invention is to provide a tool holder for an indexible and replaceable tool bit and which permits indexing or replacement of the bit without necessitating presetting of the tool and tool holder.

Other objects and advantages of the invention will be pointed out specifically or will become apparent from the following description when it is considered in conjunction with the appended claims and the accompanying drawings, in which:

Figure 1:
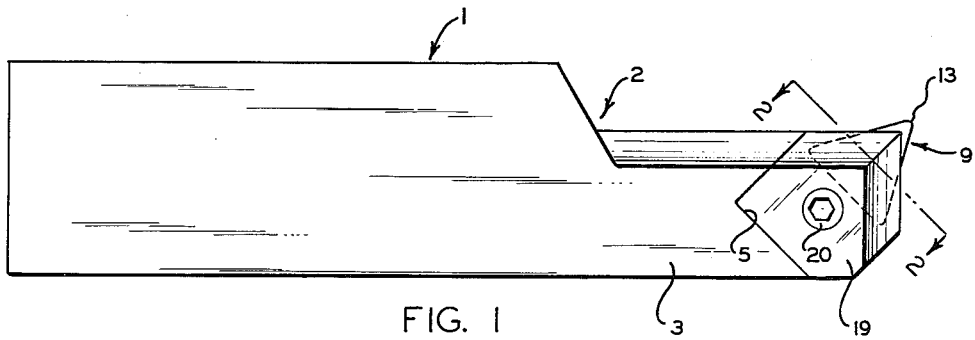
FIGURE 1 is a fragmentary plan view of a tool holder constructed in accordance with the invention and containing a throwaway or indexible tool bit.

A tool holder constructed in accordance with the embodiment of the invention shown in FIGURES 1-4 is designated generally by the reference character 1 and comprises a metal bar member 2 including a shank portion 3 having a forward end portion 4 of reduced thickness formed by notching of the shank 3 as at 5. The upper surface 6 of the forward end of the tool holder preferably is flat, whereas the lower surface 7 of the tool holder may be flat as shown or shaped to any other desired configuration.

At the forward end of the tool holder is provided an opening or cavity 8 which, in plan, presents a regular, geometric configuration. In the disclosed embodiments of the invention the cavity 8 is triangular, but it should be understood that it may have circular, rectangular or other regular polygonal shapes. In any case, the cavity 8 should be shaped to correspond to the shape of the tool bit to be received therein and, in the illustrative embodiments of the invention, a tool bit 9 that is adapted to be received in the cavity 8 also has a triangular shape, in plan, the apices of the triangle forming the cutting tips or surfaces.

The tool bit 9 may be formed of carbide or any other suitable material and preferably has a flat upper surface 10 and a parallel lower surface 11, the upper and lower surfaces being joined by side walls 12 which, as shown, are formed along downwardly converging lines to provide clearances for each of the three cutting tips 13 of the tool. The angle of convergence of the side walls 12 may vary from one tool manufacturer to another, but it is not uncommon for such tool bits to have their sides formed at angles of 10°.

The cavity 8 preferably is provided with a flat base or bottom 14 which parallels the upper surface 6 of the tool holder. The edges of the cavity are defined by wall portions 15 which are substantially perpendicular to the cavity base 14, but the perpendicular portion of each wall 15 terminates short of the upper surface 6 of the tool holder. The upper edge of each side wall 15 is flared outwardly of the cavity as at 16 and complements the inclination of the wall portions 12 of the tool bit 9, the purpose of which will be pointed out hereinafter.

Figure 3:
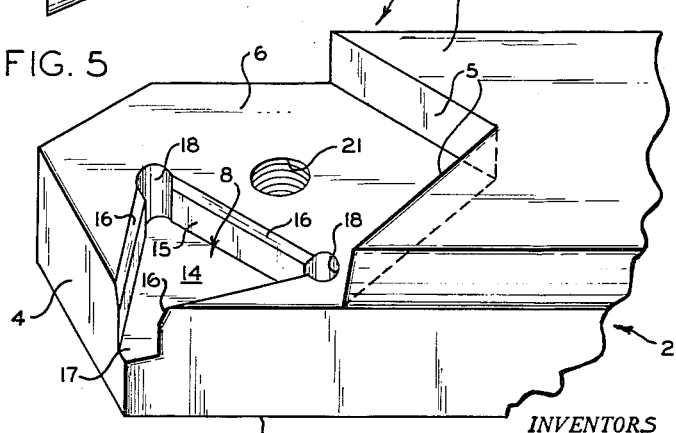
FIGURE 3 is an enlarged, isometric view of the tool holder with the tool bit and clamp removed.

As is best shown in FIGURE 3, each adjacent wall of the cavity 8 converges along intersecting lines, but the placement of the cavity 8 relative to the forward end of the tool holder is such that the sides of the cavity extending toward the forward end of the tool holder converge along lines that intersect beyond the forward end of the tool holder. As a result, the forward end of the cavity 8 is open, the opening being designated by the reference character 17. Instead of permitting the other walls of the recess to intersect one another at angles, arcuate niches 18 are provided between adjacent walls.

When assembling the tool bit 9 with the tool holder 1, the bit is inserted in the cavity 8 with its smaller area surface 11 lowermost and with its three side walls 12 in face-to-face engagement with the wall portions 16 of the cavity. In these positions of the parts, one of the cuttings tips 13 will extend through the cavity opening 17 a distance sufficient to enable it to engage a workpiece (not shown), and the other two cutting tips 13 will be received in the arcuate niches 18 and spaced somewhat from the edges of the niches so as to avoid nicking the cutting tips. When the tool bit is received within the cavity 8 an upper clamp plate 19 may be placed over the major portion of the bit 9 and be securely, but removably, clamped against the upper surface 10 of the bit by turning down an anchor bolt 20 which passes through the clamp 19 and is received in a threaded opening 21 formed in the forward end of the tool holder.

The lower surface of the clamp member 19 preferably is provided with a projection 22 adapted to engage only the tool bit 9 so as to enable the force exerted by the clamp 19 to be substantially normal to the plane of the upper surface of the bit. Since the bit engages only the inclined portions 16 of the walls of the cavity, the application of a substantially vertical force to the bit will cause it to center itself relatively to the cavity.

When the tool bit is clamped in the cavity 8, it is trapped therein by engagement of all three of its sides with the walls of the cavity. Because of the inclination of the sides of the tool bit and the complementary inclination of the upper edges of the cavity walls, the bit is firmly seated or wedged against all three sides of the cavity and is incapable of movement relatively to the tool holder. Consequently, the tool may be fed to the workpiece from any direction without risking relative movement between the bit and its holder.

The thickness of the tool bit 9 and the depth of the cavity in the tool holder may vary, but it is preferred that the thickness of the bit and the size of the cavity be such that the upper surface of the bit extends slightly above the upper surface 6 of the tool holder. This construction not only assures the application of a clamping force directly against the tool bit by the clamp 19, but also enables the upper edges of the tool bit to protect the upper edges of the cavity walls 16 from harm.

Figure 2:
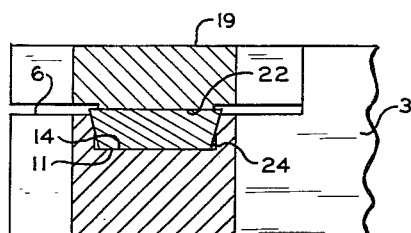
FIGURE 2 is a sectional view taken on the line 2—2 of FIGURE 1.
Figure 6:
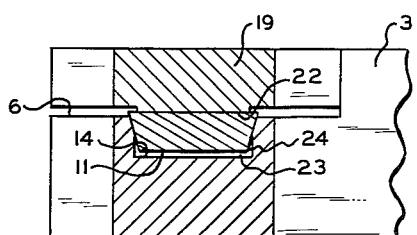
FIGURE 6 is a view similar to FIGURE 2, but illustrating a somewhat modified embodiment of the invention.
Figure 4:
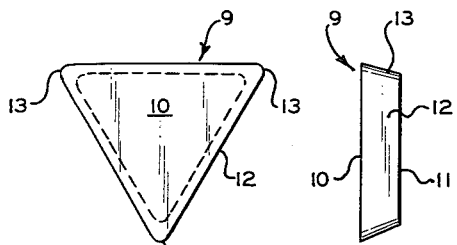
FIGURES 4 and 5 are respectively an isometric and side view of one form of a tool bit that is adapted to be used in the tool holder shown in FIGURES 1-3.
Figure 5:
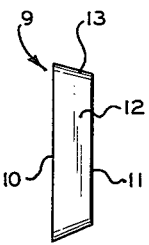

As is indicated in FIGURE 2, the thickness of the tool 9 and the relative size of the cavity 8 may be such that the lower surface 11 of the tool bit engages the base 14 of the cavity. Alternatively, as is shown in FIGURE 5, the tool bit may be made somewhat less thick or the cavity 8 formed somewhat more deeply so as to provide a small clearance 23 between the confronting surfaces 11 and 14 of the parts. Regardless of whether or not the lower surface of the tool bit bears directly against the base of the cavity, the perpendicular wall portions 15, together with the inclined edges 12 of the tool bit, provide a space 24 around the entire perimeter of the base of the cavity 8. The space 24 is an important characteristic of the instant construction since it is located at a region of the cavity that is particularly difficult to keep clear of chips and the like. Due to the space 24, however, the presence of chips or other foreign matter at the bottom edges of the cavity will not interfere with proper seating of the tool bit. This characteristic of the invention is heightened by the construction shown in FIGURE 5 inasmuch as no part of the lower portion of the tool bit engages the base of the recess 8. Despite the clearance between the base of the recess and the lower surface of the tool bit in the FIGURE 5 assembly, however, the tool bit is firmly supported along all of its sides by the inclined wall portions 16 of the cavity.

The disclosed embodiments are representative of presently preferred forms of the invention, but are intended to be illustrative rather than definitive thereof. The invention is defined in the claims.

We claim:

1. A tool holder comprising a support member having upper and lower surfaces and a cavity formed in said upper surface of said member adjacent one end thereof, said cavity presenting in plan a substantially regular geometric configuration having side walls that converge toward said one end of said member along lines that intersect beyond said one end of said member, whereby said cavity has an opening at said one end of said member, each of the side walls of said cavity having an upper portion adjacent the upper surface of said member inclined from said upper surface toward the lower surface of said support member along lines that converge toward the lower surface of said support member, each of the side walls of said cavity having lower portions extending toward the lower surface of said support member along non-converging lines; a tool bit having a shape in plan corresponding substantially to the shape of said cavity and being removably received in the latter with a part thereof extending through the opening in said cavity, said tool bit having the full height of each of its sides sloping complementally to the inclination of said upper portions of said cavity side walls, said tool bit having a thickness greater than the inclined portions of said cavity walls so as to extend beyond the inclined portions of said cavity walls in a direction toward the lower surface of said support member whereby the sloping walls of said tool bit and said lower portions of said cavity walls provide a clearance all around said tool bit; and releasable clamp means reacting between said support member and said tool bit for releasably clamping the latter in said cavity.

2. The construction set forth in claim 1 wherein said cavity includes a base intermediate the upper and lower surfaces of said support member and wherein said tool bit is of such thickness that it seats on said base.

3. The construction set forth in claim 1 wherein said cavity includes a base intermediate the upper and lower surfaces of said support member and wherein said tool bit is of such thickness that it is spaced from said base.

4. The construction set forth in claim 1 wherein said cavity has a substantially triangular shape in plan.

References Cited in the file of this patent

UNITED STATES PATENTS

| | | |
|---|---|---|
| 2,378,094 | Nunes-Vaz | June 12, 1945 |
| 2,598,581 | McKenna | May 27, 1952 |
| 2,697,866 | Greenleaf | Dec. 28, 1954 |
| 2,808,637 | Hudson | Oct. 8, 1957 |
| 2,814,854 | Murray | Dec. 3, 1957 |
| 2,865,084 | Wendt | Dec. 3, 1958 |
| 2,897,580 | Huber | Aug. 4, 1959 |